United States Patent [19]
Hiraiwa

[11] 3,735,846
[45] May 29, 1973

[54] SYNCHRONIZING MECHANISM OF POWER TRANSMISSION

[75] Inventor: Kazuyoshi Hiraiwa, Tachikawa, Tokyo, Japan

[73] Assignee: Nissan Motor Company, Limited, Yokohama, Japan

[22] Filed: Dec. 7, 1971

[21] Appl. No.: 205,674

[30] Foreign Application Priority Data

Feb. 23, 1971 Japan..................................46/8372

[52] U.S. Cl. .............................192/53 A, 192/53 C
[51] Int. Cl..............................................F16d 23/04
[58] Field of Search...................192/53 A, 53 C, 53 F

[56] References Cited
UNITED STATES PATENTS

| | | | |
|---|---|---|---|
| 3,200,920 | 8/1965 | Reich | 192/53 C |
| 3,633,716 | 1/1972 | Gortz | 192/53 C |

*Primary Examiner*—Allan D. Herrmann
*Attorney*—John Lezdey

[57] ABSTRACT

An improved synchronizing mechanism for a synchromesh power transmission is disclosed, having a cee spring having spaced end portions between which a land of the synchronizing ring and one of axial extensions of a sleeve bearing are loosely received. When a sleeve is axially moved by a gear shifting unit of the power transmission, the cee spring is forced to expand by a rotational force imparted to the synchronizing ring so that the synchronizing ring is driven in synchronism with the gear of the rotary shaft of the transmission.

1 Claim, 13 Drawing Figures

PATENTED MAY 29 1973

3,735,846

INVENTOR
KAZUYOSHI HIRAIWA
BY John Lezeley
ATTORNEY

INVENTOR
KAZUYOSHI HIRAIWA
BY John Fedley
ATTORNEY

SYNCHRONIZING MECHANISM OF POWER TRANSMISSION

This invention relates to power transmissions and, more particularly, to synchronizing mechanisms of synchro-mesh power transmissions for use, for instance, with motor vehicles.

A difficulty is sometimes experienced in accomplishing smooth engagement of two gears which are being driven at greatly different circumferential speeds in a geared power transmission particularly of a motor vehicle. When, for example, gear shifting operation is to be effected in such power transmission, the gears to be meshed together do not readily engage with each other, only producing noises. This is accounted for by the fact that, when a neutral condition is established during gear shifting operation, the driven gear is rotated by an inertia of the motor vehicle while the driving gear, which in this condition is disconnected from the engine crankshaft with the clutch uncoupled, rotates at abruptly diminishing speeds so that the differential in circumferential speed of the two gears is progressively increased.

During down-shift operation, in particular, complicated manipulative steps are required including the double-clutch operation so that the rotational speed of the drive shaft is once increased before the gears are meshed together.

To avoid these difficulties arising in the geared power transmissions, a synchro-mesh power transmission has a synchronizing mechanism, acting as a synchronous friction clutch, which is interposed between the driven shaft and the transmission gears. This synchronizing mechanism brings the gears to be meshed approximately to the correct speed just before meshing and minimizes "clashing".

A prime object of this invention is thus to provide a synchronizing mechanism of this nature and adapted to accomplish smooth engagement of the driving and driven gears during gear shifting.

The synchronizing mechanism achieving this objects comprises, in combination with a rotary shaft and a gear rotatable on the shaft and having external gear splines and an outer conical wall section, a sleeve bearing having a hub portion splined to keyed to the rotary shaft and positioned adjacent the gear on the shaft and a plurality of substantially equiangularly spaced radial extensions extending radially outwardly of the hub portion, the radial extensions having respectively formed at their outer ends axial extensions one of which is thicker the others; a synchronizing ring located between the gear and the sleeve bearing and having a radial extension formed on its outer peripheral wall, an inner conical wall engageable with the outer conical wall section of the gear and a land formed on the outer peripheral wall; a sleeve having formed on its inner peripheral wall axial splines which are engageable with the gear splines of the gear when the sleeve is in mesh therewith and a plurality of axial grooves formed in its inner peripheral wall and snugly receiving therein the axial extensions of the sleeve bearing; and a C-spring disposed between the synchronizing ring and the sleeve and having opposed ends which are spaced a distance greater than the width of the land of the synchronizing ring to loosely received the land therebetween, these opposed end portions having an internally stepped edged portion spaced from each other a distance greater than the width of aforesaid one of the axial extensions for loosely receiving therebetween this particular extension. The splines on the inner peripheral wall of the sleeve are reduced at their ends through slopes which are engageable with an annular slope of an outer edge of the cee spring.

The sleeve above mentioned is usually provided with an annular groove formed in its outer peripheral wall. This annular groove is intended to engage with an actuating element of a gear shifting unit of the power transmission so that the sleeve is axially movable.

Other features and advantages over prior art counterparts of the synchronizing mechanism according to this invention will become more apparent from the following detailed description taken in connection with the accompanying drawings, in which.

Figure 1:
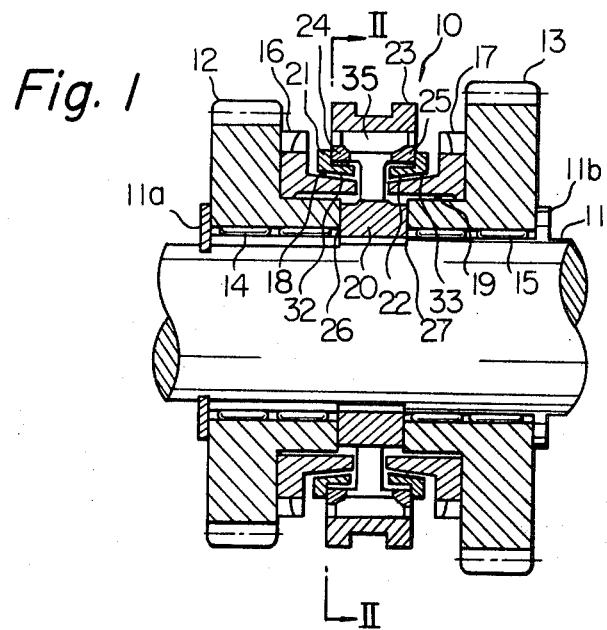
FIG. 1 is a sectional view of a preferred embodiment of the synchronizer mechanism according to the invention, the section being taken on lines I—I of FIG. 2.
Figure 2:
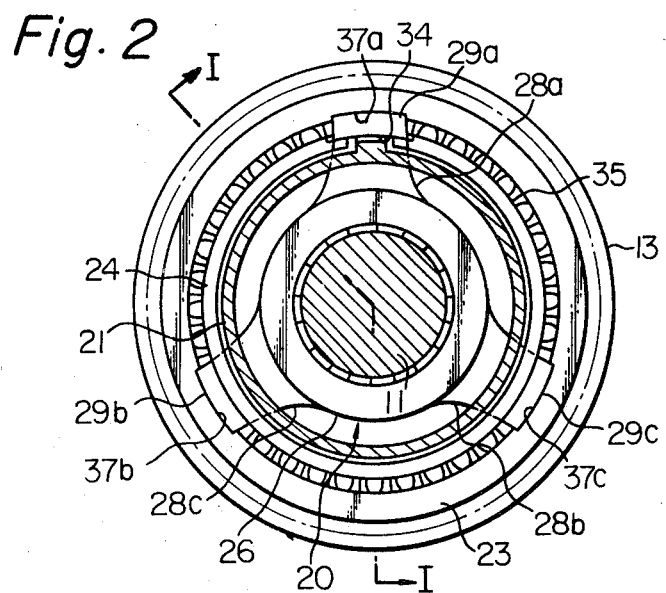
FIG. 2 is a cross sectional view of the synchronizing mechanism taken on line II—II of FIG. 1 but disassembling gear 12 and external gear spline 16.

Reference is now made to FIGS. 1 and 2 which illustrate an overall construction of the synchronizing mechanism, under its neutral condition, embodying this invention. The synchronizing mechanism, generally indicated by reference numeral 10, is placed on use with a synchro-mesh power transmission including a shaft 11. This shaft 11 is herein assumed to be a drive shaft of the power transmission, although the same may be a driven shaft depending upon the application of the synchronizing mechanism. Spaced driven gears 12 and 13 having different numbers of gear teeth are rotatable on the drive shaft 11 through bearings 14 and 15, respectively. Axial movements of these gears 12 and 13 are prohibited by means of stop members 11a and 11b which are mounted on or integral with the shaft 11. The gears 12 and 13 respectively have external gear splines 16 and 17 and outer conical wall sections 18 and 19 slanting downwardly toward each other. These gears 12 and 13 are in constant mesh with respective mating gears having different number of teeth as usual, though not so shown.

The synchronizing mechanism 10 is thus located intermediate between the gears 12 and 13 so that either of them is driven from the shaft 11 during operation. This synchronizing mechanism 10 largely consists of a sleeve bearing 20, a pair of synchronizing rings 21 and 22, a sleeve 23 and a pair of C-springs 24 and 25.

The sleeve bearing 14 has a hub portion 26 which is splined or keyed to the drive shaft 11 as at 27 and which is interposed between axial extensions, not numbered, of the gears 12 and 13. Usually three, substantially equiangularly spaced radial extensions 28a, 28b and 28c extend radially outwardly from the hub portion 26 of the sleeve bearing and have formed at their outer ends axial extensions 29a, 29b and 29c. One of these axial extensions that may be the extension 29a as shown has a thickness greater than the thickness of the remaining axial extensions 29b and 29c which, as such, are substantially identical in dimensions to each other.

Figure 6:
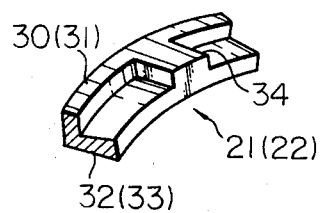
FIG. 6 is a fragmentary perspective view showing partly a synchronizing ring forming part of the synchronizing mechanism in accordance with this invention.

The synchronizing rings 21 and 22, positioned on both sides of the sleeve bearing 20, have radical extensions 30 and 31 adjacent radial walls of the gears 12 and 13, respectively, and inner conical walls 32 and 33 which are engageably with the outer conical wall sections 18 and 19 of the gears 12 and 13, respectively. Each of the synchronizing rings 21 and 22 has formed on is outer peripheral wall a land 34 which is clearly seen in FIG. 6.

The sleeve 23 has formed on its inner peripheral wall axial splines 35 which are engageable with the gear spline 16 or 17 of the gear 12 or 13 when the sleeve is to mesh with either of these gears 12 and 13, as will be described later. These axial splines 35 are reduced at their end portions through slopes as indicated at 36 in FIGS. 3B, 4B or 5B. The sleeve 23 has also formed in its inner peripheral wall three axial grooves 37a, 37b and 37c which snugly receive therein the axial extensions 29a, 29b and 29c, respectively, of the sleeve bearing 20, as seen in FIG. 2. The sleeve bearing 20 and sleeve 23 are thus rotatable together with the shaft 11. The sleeve 23 has further formed in its outer peripheral wall an annular groove 38 which is to engage with an actuating element, not shown, of a gear shifting unit of the power transmission.

The C-springs 24 and 25 are configured substantially identically to each other and are positioned symmetrically with respect to the sleeve bearing 20 when the synchronizing mechanism is held in a neutral position shown in FIGS. 1 and 2. Thus, only the C-spring 24 will be herein described because the description thereon entirely applies to the C-spring 25. The cee spring 24 has spaced end portions 39 and 40 which have internally stepped edges 39a and 40a, respectively, as clearly seen in FIGS. 3A, 4A and 5A. The C-spring 24 also has a circumferential slope 41 at its outer edge, this circumferential slope being engageable with the slope 36a of the sleeve 23. The C-spring 24 is disposed between the sleeve bearing 20 and synchronizing ring 21 in such a manner that the land 34 of the synchronizing ring 21 is located intermediate between the spaced end portions 39 and 40 while the axial extension 29a having an enlarged thickness of the sleeve bearing 20 is located intermediate between the internally stepped edges 39a and 40a of the spaced end portions 39 and 40, respectively.

Each of the C-springs 24 and 25 is so sized as to have an outside diameter larger than the inside diameter of the sleeve bearing 20 when the C-spring is maintained under an unloaded condition. As particularly seen in FIG. 3A, the spacing between the opposed end portions 39 and 40 of the C-spring 24, as indicated by X, is appreciably larger than the width x of the land 34 of the synchronizing ring 21 while the spacing Y between the internally stepped edges 39a and 40a of the end portions 39 and 40, respectively, is appreciably larger than the width Y of the axial extension 29a of the sleeve bearing 20 when the C-spring is in the unloaded condition and accordingly the synchronizing mechanism is held in its neutral condition.

The sleeve bearing 20, sleeve 23, C-springs 24 and 25 and synchronizing rings 21 and 22 are all rotatable together with the driving shaft 11. Since, however, the land 34 of each of the synchronizing rings 21 and 22 and the axial extension 29a of the sleeve bearing 20 are loosely received within the spacings between the end portions 39 and 40 and the stepped edges 39a and 40 of the C-spring 24, the synchronizing rings because of the above mentioned dimensional relations, the synchronizing rings 21 and 22 and the sleeve bearing 20 are circumferentially movable relative to the C-springs 24 and 25. Furthermore, the synchronizing rings 21 and 22 are axially movable relative to the sleeve bearing 20 and sleeve 23 until they are brought into engagement with the conical wall sections 18 and 19 of the gears 12 and 13, respectively.

The operation of the synchronizing mechanism thus constructed will now be described.

Figure 3A:
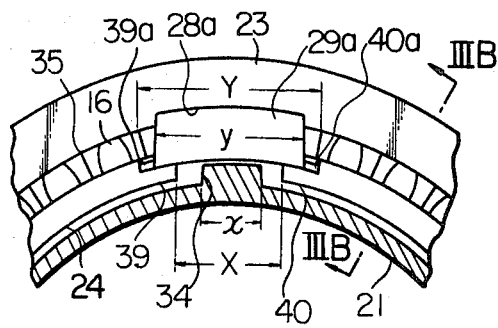
FIG. 3A is a fragmentary view showing essential parts of the synchronizing mechanism in a neutral condition.
Figure 3B:
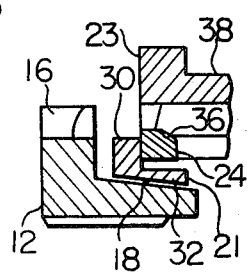
FIG. 3B is a section taken on line IIIB—IIIB of FIG. 3A.

When the synchronizing mechanism is maintained in its neutral condition illustrated in FIGS. 3A and 3B, the sleeve 23 is positioned axially centrally of the sleeve bearing 20 as seen in FIG. 1 and, at the same time, the synchronizing rings 21 and 22 are held out of contact with the outer conical wall sections 18 and 19 of the gears 12 and 13, respectively, as seen in FIG. 3B. Under this contition, the sleeve bearing 23, sleeve 20, synchronizing rings 21 and 22 and C-springs 24 and 25 are rotated with the shaft 11 by the inertia of the motor vehicle while the gears 12 and 13 are rotated independently of the shaft 11.

Figure 4A:
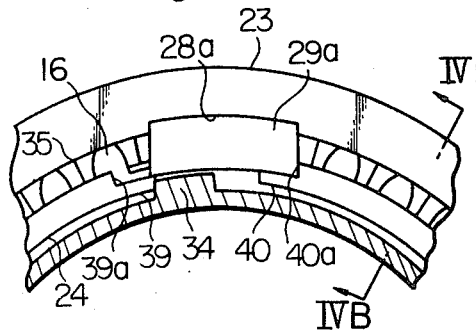
FIG. 4A is a view similar to FIG. 3A but illustrates the synchronizing mechanism in the process of synchronizing operation.
Figure 4B:
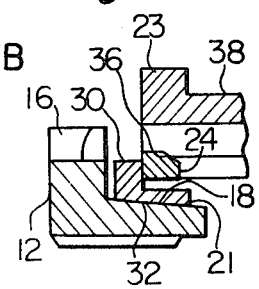
FIG. 4B is a section taken on line IVB—IVB of FIG. 4A.

If, in this condition, the gear shifting unit of the power transmission is operated so that the actuating element thereof is moved to move the sleeve 23 toward the gear 12, viz., leftwardly of FIG. 1, the C-spring 24 and accordingly the synchronizing ring 21 are forced toward the gear 12 by reason of the spring action exerted by the cee spring 24 until the synchronizing ring 21 has its inner conical wall 32 brought into abutting engagement with the outer conical wall secton 18 of the gear 12, as shown in FIG. 4B. A rotational force is thus produced between the gear 12 and synchronizing ring 21 due to the differential rotations of the gear and synchronizing ring. A traction is consequently imparted to the synchronizing ring 21 from the gear 12 with the result that the sleeve 23 and sleeve bearing 20 are circumferentially moved relative to the synchronizing ring 21 through distances corresponding to the differences between X and x and Y and y so as to assume the relative positions illustrated in FIG. 4A. As seen in FIG. 4A, the rotational force acting upon the synchronizing ring 21 is carried to the sleeve bearing 23 through the land 34 of the synchronizing ring 21 and the cee spring 24. The C-spring 24 is consequently forced to expand from its rest position so that the pressure exerted on the C-spring 24 from the sleeve 20 through their conical walls 18 and 32 acts to force the synchronizing ring 21 toward the gear 12. The effort given by the actuating element of the gear shifting unit to the sleeve 23 is thus consumed in contracting the C-spring 24. The synchronizing action commences in this manner. Such synchronizing action will be facilitated if the movement of the sleeve 23 toward the gear 12 is resisted until the gear 12 is driven in synchronism with the drive shaft 11. This is achieved if a force serving to expand the C-spring 24 by the rotational force exerted on the synchronizing ring 21 is constantly greater than a force serving to contract the C-spring 24 by the pressure exercised between the conical walls 18 and 32 of the gear 12 and synchronizing ring 21, respectively.

The rotational force produced between these conical walls 18 and 32 due to the friction therebetween provides the capacity of the synchronizing mechanism and, therefore, the synchronizing action terminates when the gear 12 and the synchronizing ring 21 are rotated at a common speed.

Figure 5A:
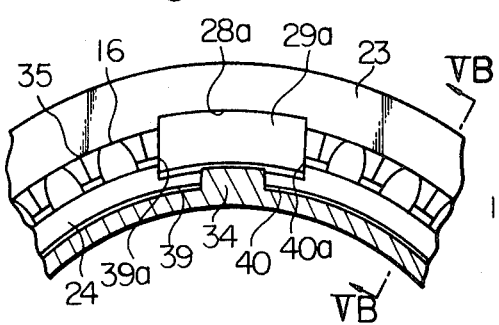
FIG. 5A is also similar to FIG. 3A but now shows the synchronizing mechanism which is in a completely synchronized condition.
Figure 5B:
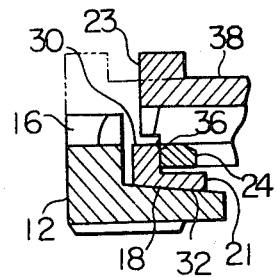
FIG. 5B is a section taken on line VB—VB of FIG. 5A.

When, thus, the synchronizing action is complete, then the rotational force acting between the conical walls 18 and 32 disappears so that the C-spring 24 is urged to expand only by its tension. This tension is overcome by the force acting to move the sleeve 23 whereby the C-spring 24 is contracted to arrest the land 34 of the synchronizing ring 21 and the axial extension 29a of the sleeve bearing 20, as seen in FIG. 5A. Under the condition in which the synchronizing action is finished, the relative positions of the synchronizing ring 21 and sleeve bearing 20 are identical with those established under the neutral condition indicated in FIGS. 3A and 3B. Since, however, the C-spring 24 is held in a contracted condition, the spacing between its opposed end portions 39 and 40 and the spacing between the internally stepped edges 39a and 40a of these end portions are now in agreement with the widths $x$ and $y$ of the land 34 of the synchronizing ring 21 and the axial extension 29a of the sleeve bearing 20, respectively. The gear 12 and synchronizing ring 21 now being stated at a common speed, the sleeve 23 is permitted to freely move toward the gear 12 and consequently engage therewith through their splines 16 and 35. The gear shifting operation terminates when the sleeve 23 assumes the position indicated in phantom in FIG. 5B.

The advantages of the thus constructed synchronizing mechanism over the prior art counterparts will now be described with reference to FIGS. 7A and 7B et seq. which illustrate basic operational principle of the prior art synchronizing mechanism. The parts and elements of this prior art synchronizing mechanism are designated by reference numerals corresponding to those of the mechanism hereinbefore described with primes attached thereto.

Figure 8:
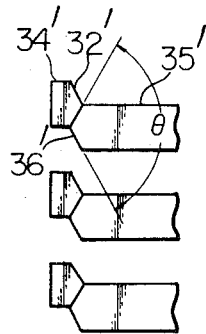
FIGS. 7A and 7B and FIGS. 8 and 9 are schematic views which are presented to illustrate basic operational principles of a representative prior art synchronizer.
Figure 7A:
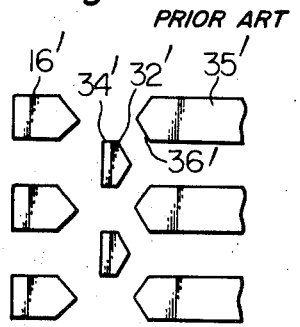
Figure 7B:
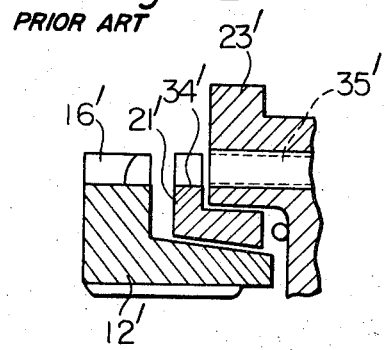

Referring to FIGS. 7A, 7B and 8, the leftward movement of the sleeve 23' is blocked in such a manner that the chamfered edges 32' of the splines 34' of the synchronizing ring 21' are brought into end-to-end contact with the chamfered edges 36' of the splines 35' of the sleeve 23'. When the synchronizing action is complete, the force to leftwardly move the sleeve 23' acts to slightly rotate the synchronizing ring 21 relative to the sleeve by the pressure exercised between the chamfered edges 32' and 36', thus permitting the sleeve 23' to move leftwardly.

Figure 9:
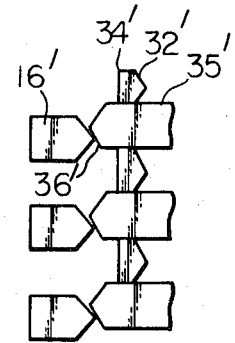

In order that the synchronizing action is effected in the mechanism thus operating, it is important that the splines 34' and 35' be chamfered at 32' and 36' at angles ranging from 100° to 120°. This means that smooth engagement between the splines 34' of the sleeve 23' and the splines 16' of the gear 12' is impracticable when the synchronizing action is complete, see FIG. 9. Thus, under the condition in which the synchronizing action is complete, the sleeve 23' engages with the gear 12' while being adjusted in its position in the direction of rotation by the action between the chamfered edges 32' and 36' if the splines 35' of the sleeve 23' are out of alignment with the splines 16' of the gear 12'. If, therefore, the edges 32' and 36' are chamfered at large angles, a considerably great force will be indispensable for removing the frictional force still existing between the synchronizing ring 21' and the conical wall section 18' of the gear 12', thus providing a bar to smooth accomplishment of the gear shifting operation.

In the synchronizing mechanism according to this invention, no important role is played by such chamfered edges of the splines of the sleeve in effecting the synchronizing action so as to provide wide selection of the chamfered edges, thus providing smooth engagement between the sleeve and gear.

What is claimed is:

1. A synchronizing mechanism for use with a power transmission having a rotary shaft and a gear rotatable on said shaft and having external gear splines and an outer conical section, which mechanism comprises a sleeve bearing rotatable with said shaft and positioned adjacent said gear, said sleeve bearing having a hub portion connected to said shaft and a plurality of substantially equiangularly spaced radial extensions extending from said hub portion, said radial extensions having respectively formed at their outer ends axial extensions one of which is thicker than the others; a synchronizing ring located between said gear and said sleeve bearing and having a radial extension formed on its outer peripheral wall, an inner conical wall engageable with said outer conical wall section of said gear and a land formed on said outer peripheral wall; a sleeve having formed on its inner peripheral wall axial splines engageable with said gear splines on said gear and axial grooves formed on said inner peripheral wall and snugly receiving therein said axial extensions of said sleeve bearing, said axial splines being reduced at their ends through slopes; and a C-spring disposed between said synchronizing ring and said sleeve and having opposed end portions which are spaced from each other a distance greater than the width of said land of said synchronizing ring for circumferentially movably receiving therein said land, said opposed end portions respectively having internally stepped edges which are spaced from each other a distance greater than the width of said one of the axial extensions of the sleeve bearing for circumferentially movably receiving therebetween said one of the axial extensions, said C-spring having an annular slope formed at its outer edge and engageable with said slopes of the splines of the sleeve.

* * * * *